United States Patent
Skiles (10) Patent No.: US 8,392,084 B2
(45) Date of Patent: Mar. 5, 2013

(54) INCREASING ALL-WHEEL DRIVE SYSTEM CALIBRATION EFFICIENCY THROUGH HARDWARE-IN-THE-LOOP SIMULATION TECHNIQUES

(75) Inventor: Randy Lee Skiles, Marysville, OH (US)

(73) Assignee: Honda Motor Co., Ltd, Tokyo (JP)

(*) Notice: Subject to any disclaimer, the term of this patent is extended or adjusted under 35 U.S.C. 154(b) by 386 days.

(21) Appl. No.: 12/875,964

(22) Filed: Sep. 3, 2010

(65) Prior Publication Data

US 2012/0059562 A1 Mar. 8, 2012

(51) Int. Cl.
*B60K 17/35* (2006.01)

(52) U.S. Cl. .......................................... 701/69; 303/143
(58) Field of Classification Search .................... 701/69, 701/51–56, 61, 67, 87–95; 303/143; 477/180, 477/181, 110, 43, 62; 180/233, 248, 245
See application file for complete search history.

(56) References Cited

U.S. PATENT DOCUMENTS

| | | | |
|---|---|---|---|
| 5,375,461 A | 12/1994 | Suzuki | |
| 5,631,829 A * | 5/1997 | Takasaki et al. | 701/69 |
| 5,752,211 A | 5/1998 | Takasaki et al. | |
| 5,938,712 A | 8/1999 | Ibamoto et al. | |
| 6,295,500 B1 | 9/2001 | Cullen et al. | |
| 6,360,156 B1 | 3/2002 | Morganroth et al. | |
| 6,711,487 B2 | 3/2004 | Murakami et al. | |
| 6,933,692 B2 * | 8/2005 | Gabriel et al. | 318/432 |
| 7,048,084 B2 * | 5/2006 | Shigeta et al. | 180/248 |
| 7,264,078 B2 | 9/2007 | Rodeghiero | |
| 7,306,545 B2 | 12/2007 | Lanker | |
| 2003/0218439 A1 * | 11/2003 | Gabriel et al. | 318/433 |
| 2004/0035622 A1 * | 2/2004 | Ito et al. | 180/197 |
| 2008/0126044 A1 * | 5/2008 | Degaki | 703/8 |

OTHER PUBLICATIONS

Bairati, G., "Simulating an AWD Vehicle using ADAMS/Driveline," *Proceedings of the 2000 International ADAMS User Conference*, Jun. 21, 2000, Mechanical Dynamics, Orlando, Florida, USA, eighteen pages.
Realtime Technologies, Inc., "Powertrain Library," two pages. [Online] [Retrieved Sep. 29, 2009] Retrieved from the Internet <URL:http://simcreator.com/product_sheets/powertrain_ps.pdf.>.

* cited by examiner

*Primary Examiner* — Thomas Black
*Assistant Examiner* — Marthe Marc-Coleman
(74) *Attorney, Agent, or Firm* — Fenwick & West LLP; Mark Duell (57) ABSTRACT

A method and system for generating a torque map operating a vehicle's all-wheel drive ("AWD") system are disclosed. A model describing how an all-wheel drive ("AWD") electronic control unit ("ECU") included in the vehicle processes data received from one or more sensors or vehicle subsystems is generated and executed on a computing device so that the computing device emulates operation of the AWD ECU. The computing device captures data from a controller area network ("CAN") included in the vehicle and data from the vehicle describing wheel torque while emulating operation of the AWD ECU. A raw torque value is generated by the computing device from the data from the CAN and wheel torque. The raw torque value is used to generate a torque value associated with an engine speed and with an intake air pressure obtained from the data captured from the CAN.

25 Claims, 4 Drawing Sheets

INCREASING ALL-WHEEL DRIVE SYSTEM CALIBRATION EFFICIENCY THROUGH HARDWARE-IN-THE-LOOP SIMULATION TECHNIQUES

FIELD OF THE INVENTION

This invention relates generally to calibration of a vehicle all-wheel drive system, and more particularly to using a model to generate a torque map for calibrating a vehicle's all-wheel drive system.

BACKGROUND OF THE INVENTION

Calibration of a vehicular all-wheel drive system is a time intensive task generally requiring substantial mechanical and human resources. Current methods for calibrating a vehicular all-wheel drive system involve multiple steps and require various types of equipment to create the base bias, or base torque map, of the all-wheel drive system. For example, a chassis dynamometer is used to measure torque and power delivered by a vehicle's power train or torque applied to the vehicle's wheels. Data from the chassis dynamometer is used to provide an initial torque map which is confirmed by driving the vehicle using the initial torque map to identify discrepancies which are iteratively tuned by manually changing data and re-confirming the changed data in the vehicle until the torque map provides a desired trend.

An alternative method for creating the base torque map for an all-wheel drive ("AWD") system uses a simulation bench, rather than manual modification, to iteratively modify the discrepancies between the initial torque map generated by the chassis dynamometer and data from in-vehicle confirmation of the initial torque map. While using the simulation bench to modify the initial torque map reduces the time used to test modified data, this method still relies on the chassis dynamometer and incremental modification of the initial torque map.

Hence, what is needed is a system and method for more efficient use of resources to generate a base torque map for an AWD drive system.

SUMMARY OF THE INVENTION

The present invention provides a system and a method for generating a torque map operating an all-wheel drive system ("AWD") of a vehicle. A model describing how an all-wheel drive ("AWD") electronic control unit ("ECU") included in the vehicle processes data received from one or more sensors or vehicle subsystems is generated and executed on a computing device. Executing the model causes the computing device to emulate operation of the AWD ECU. While emulating operation of the AWD ECU, the computing device captures data from a controller area network ("CAN") included in the vehicle and also captures data from the vehicle describing a torque associated with one or more vehicle wheels. Based on the data captured from the CAN and the data describing wheel torque, the computing device uses the executed model to generate a raw torque value, which is filtered to generate a torque value associated with an engine speed and with an intake air pressure obtained from the data captured from the CAN. The torque value and its associated engine speed and intake air pressure are stored in a computer readable storage medium included in the computing device. In one embodiment, the computing device determines a plurality of torque values each associated with an engine speed and an intake air pressure to produce a torque map which is transmitted from the computing device to the AWD ECU being emulated, allowing the AWD ECU to distribute torque among the wheels according to the torque map when the vehicle is driven.

In one embodiment, a correction factor is also generated by the computing device emulating the AWD ECU. After determining an elevation associated with the vehicle, the computing device uses the executed model to generate a correction factor associated with the determined elevation using the generated torque map, data captured from the CAN and the data describing wheel torque. The correction factor is stored in a memory of the computing device and is transmitted to the AWD ECU in one embodiment. In one embodiment, the correction factor is applied to the torque value to produce a corrected torque value which corresponds to a torque value obtained at specified elevation.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

DETAILED DESCRIPTION OF THE INVENTION

A preferred embodiment of the present invention is now described with reference to the Figures where like reference numbers indicate identical or functionally similar elements. Also in the Figures, the left most digits of each reference number correspond to the Figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

Figure 1:
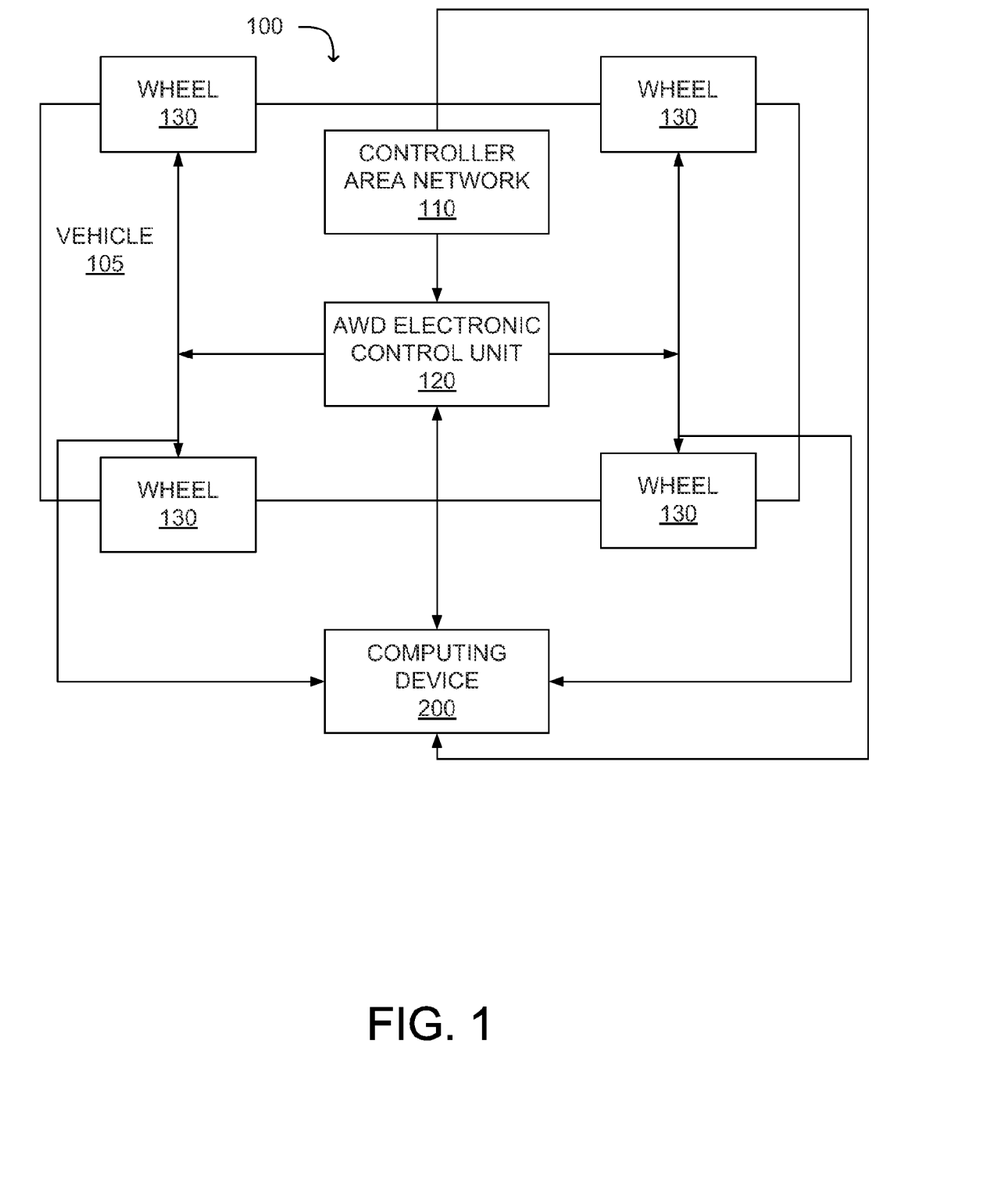
FIG. 1 is a block diagram of a system for generating a torque map according to an embodiment of the invention.
Figure 2:
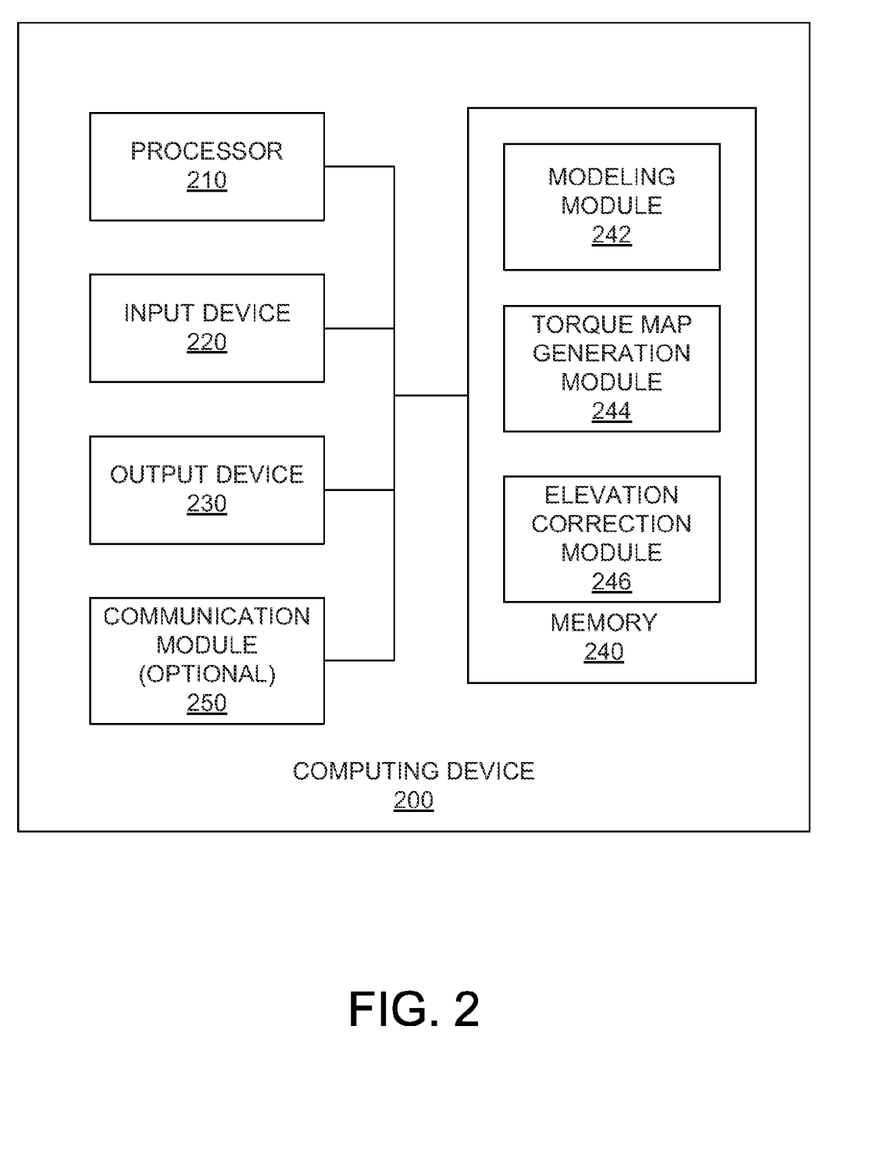
FIG. 2 is a block diagram of a computing device in which one embodiment of the present invention operates.

FIG. 1 is a block diagram of one embodiment of a system 100 for generating a torque map for a vehicular all-wheel drive ("AWD") system. A vehicle 105, such as a car or truck, includes a controller area network ("CAN") 110 coupled to an AWD electronic control unit ("ECU") 120. The AWD ECU 120 is also coupled to the wheels 130 of the vehicle. A computing device 200, further described below in conjunction with FIG. 2, is also coupled to the CAN 110, the ECU 120 and to one or more sensors coupled to one or more of the wheels 130.

The CAN 110 comprises a communication network interconnecting various components within the vehicle 105. The CAN 110 enables electronic control units and devices within the vehicle 105 to communicate without using a host computer. Although FIG. 1 shows the vehicle 105 as including an AWD ECU 120, the vehicle 105 also includes additional electronic control units for controlling various additional vehicle subsystems, such as airbag deployment, antilock breaking, transmission control, engine management and various other components of the vehicle 105. The CAN 110 receives feedback from sensors and provides control signals to actuators, allowing different vehicle subsystems to communicate with their constituent components and allows data exchange between different vehicle subsystems.

The AWD ECU 120 transmits drive torque to one or more wheels 130 as needed and modifies the drive torque distribution between different wheels 130. For example, the AWD ECU 120 redistributes drive torque between front wheels 130 and rear wheels 130. The AWD ECU 120 receives data from the CAN 110 and modifies torque distribution based on the received data to redistribute torque between wheels 130 based on data from other vehicle subsystems or from sensors describing driving conditions. The AWD ECU 120 includes a torque map which calculates engine torque from engine speed and intake air pressure based on data received from the CAN 110. The torque map determines the drive torque communicated to the wheels 130, which rotate according to the received drive torque to move the vehicle 105. One or more sensors are coupled to each wheel 130 or to a pair of wheels 130, such as the front wheels 130 and the rear wheels 130, and capture data describing the torque applied to the wheel or to the pair of wheels.

A computing device 200 receives data from the CAN 110 and from the wheels 130. For example, the computing device 200 receives data from the CAN 110 describing the vehicle stability assist (VSA) system, transmission settings and other data used by the AWD ECU 120. The computing device 200 modifies the data from the CAN 110 and from sensors coupled to the wheels 130 to emulate how the AWD ECU 120 processes the data from the CAN 110 and from the sensors coupled to the wheels 130. Hence, the computing device 200 emulates operation of the AWD ECU 120 to produce a raw torque value from the received data from the CAN 110 and from the wheels 130. In one embodiment, the computing device 200 modifies the raw torque value to generate torque values associated with an engine speed and with an intake air pressure. Different torque values associated with different engine speeds may be generated to produce a torque map which associates different torque values with different engine speeds and intake air pressures. The generated torque map is transmitted from the computing device 200 to the AWD ECU 120 for use during vehicle 105 operation. In one embodiment, the computing device 200 also uses the torque map to generate a correction factor map accounting for vehicle operation at various altitudes which is also transmitted to the AWD ECU 120. Using the computing device 200 to emulate the AWD ECU 120 significantly reduces the amount of time and mechanical resources used to generate the torque map for the AWD system.

FIG. 2 is an illustration of a computing device 200 in which one embodiment of the present invention may operate. The computing device 200 comprises a processor 210, an input device 220, an output device 230 and a memory 240. In an embodiment, the computing device 200 further comprises a communication module 250 including transceivers or connectors.

The processor 210 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processor 210 comprises an arithmetic logic unit, a microprocessor, a general purpose computer, or some other information appliance equipped to transmit, receive and process electronic data signals from the memory 240, the input device 220, the output device 230 or the communication module 250.

The input device 220 is any device configured to provide user input to the computing device 200 such as a cursor controller or a keyboard. In one embodiment, the input device 220 can include an alphanumeric input device, such as a QWERTY keyboard, a key pad or representations of such created on a touch screen, adapted to communicate information and/or command selections to processor 210 or memory 240. In another embodiment, the input device 220 is a user input device equipped to communicate positional data as well as command selections to processor 210 such as a joystick, a mouse, a trackball, a stylus, a pen, a touch screen, cursor direction keys or other mechanisms to cause movement adjustment of an image. In an embodiment, the input device 220 is also configured to receive data from the computer area network ("CAN") 110 and the wheels 130 allowing data from the CAN 110 or wheels 130 to be read and routed throughout the emulation of the AWD ECU 120 implemented by the computing device 200.

The output device 230 represents any device equipped to display electronic images and data as described herein. Output device 230 may be, for example, an organic light emitting diode display (OLED), liquid crystal display (LCD), cathode ray tube (CRT) display, or any other similarly equipped display device, screen or monitor. In one embodiment, output device 120 is equipped with a touch screen in which a touch-sensitive, transparent panel covers the screen of output device 230.

The memory 240 stores instructions and/or data that may be executed by processor 210. The instructions and/or data may comprise code for performing any and/or all of the techniques described herein. Memory 240 may be a dynamic random access memory (DRAM) device, a static random access memory (SRAM) device, Flash RAM or other non-volatile storage device, combinations of the above, or some other memory device or computer readable storage medium known in the art. In an embodiment, the memory 240 comprises a modeling module 242, a torque map generation module 244 and an elevation correction module 246, and is adapted to communicate with the processor 210, the input device 220, the output device 230 and/or the communication module 250.

The modeling module 242 includes computer readable program code describing operation of one or more all-wheel drive ("AWD") electronic control units ("ECUs") 120, so that when the computer readable program code is executed by the processor 210, the computing device 200 emulates performance of an AWD ECU 120. Data included in the modeling module 242 describes modification and manipulation of data from the CAN 110 and/or the wheels 130 so that the computing device 200 processes data from the CAN 110 and/or the wheels 130 in same way as the AWD ECU 120. For example, the modeling module 242 includes MATLAB® or SIMULINK® data describing lookup tables, logical operations, mathematical operations or other steps which obtain a raw torque value using data from data from the CAN 110 and from data from sensors coupled to the wheels 130. The modeling module 242 also emulates performance of sensors and actuators coupled to the AWD ECU 120 being emulated to provide an interface between the data from the CAN 110 and/or the wheels 130 and the AWD ECU 120 being emulated. MATLAB® and SIMULINK® are identified as examples, and in various embodiments the modeling module 242 includes data in any suitable format.

The torque map generation module 244 includes computer readable program code that, when executed by the processor 210, modifies one or more raw torque values produced by the modeling module 242 to generate a torque map, or a matrix of torque values. In one embodiment, the torque map generation module 244 includes data describing triggers and/or switches which bin a torque signal from one or more bands of engine speed and one or more bands of intake air pressure. In one embodiment, certain raw torque values are discarded and remaining torque values binned out of a pairing of engine speed band and intake air pressure band are averaged to produce a torque value associated with a specific pairing of engine speed and intake air pressure. Hence, the torque map generation module 244 generates a torque map which specifies torque distribution between front wheels 130 and rear wheels 130. For example, the torque map generation module 244 includes MATLAB® or SIMULINK® data describing lookup tables, logical operations, mathematical operations or other steps which obtain a torque value associated with a pairing of engine speed and intake air pressure. MATLAB® and SIMULINK® are identified as examples, and in various embodiments the torque map generation module 244 includes data in any suitable format.

The elevation correction module 246 includes computer readable program code that, when executed by the processor 210, generates a correction factor, or a correction factor map including multiple correction factors, which modifies a torque value, or modifies the torque map, to account for changes in the elevation of the vehicle 105. Operation at different elevations places different loads on a vehicle engine, so the elevation correction module 246 generates a correction factor map from the torque map generated by the torque map generation module 244, data received from the CAN 110 and/or wheels 130 and an external signal indicating an elevation change which compensates for different operation of the vehicle engine at different elevations. For example, the correction factor standardizes the torque value to reduce the effect of ambient air temperature and pressure from the torque value. Hence, the correction factor generated by the elevation correction module 246 is applied to a torque value to produce a corrected torque value corresponding to a torque value obtained at a specified elevation. Data received from the CAN 110 and from the wheels 130 is used to produce a correction factor map real time, reducing the time used to produce the correction factor map. For example, the elevation correction module 246 includes MATLAB® or SIMULINK® data describing lookup tables, logical operations, mathematical operations or other steps which obtain a torque value applicable to a pairing of engine speed and intake air pressure. MATLAB® and SIMULINK® are identified as examples, and in various embodiments the elevation correction module 246 includes data in any suitable format.

In an embodiment, the computing device 200 further comprises a communication module 250 which links the computing device 200 to a network (not shown) to other computing devices 200 or to one or more systems include in a vehicle 105. The network may comprise a local area network (LAN), a wide area network (WAN) (e.g. the Internet), and/or any other interconnected data path across which multiple devices can communicate. In one embodiment, the communication module 250 is a conventional connection, such as USB, IEEE 1394 or Ethernet, to other computing devices 120 for distribution of files and information. In another embodiment, the communication module 150 is a conventional type of transceiver, such as for infrared communication, IEEE 802.11a/b/g/n (or WiFi) communication, BLUETOOTH® communication, 3 G communication, IEEE 802.16 (or WiMax) communication, or radio frequency communication. In an embodiment, the communication module 250 also includes a CAN decoder which receives data from the CAN 110, decodes the received data and routes the data to the modeling module 242. In another embodiment, the communication module 250 additionally includes a capture system which receives torque data from one or more wheels 130 and communicates the torque data to the modeling module 242.

It should be apparent to one skilled in the art that computing device 200 may include more or less components than those shown in FIG. 2 without departing from the spirit and scope of the present invention. For example, computing device 100 may include additional memory, such as, for example, a first or second level cache, or one or more application specific integrated circuits (ASICs). Similarly, computing device 200 may include additional input or output devices. In some embodiments of the present invention one or more of the components (210, 220, 230, 240, 242, 244, 246, 250) can be positioned in close proximity to each other while in other embodiments these components can be positioned in geographically distant locations. For example the units in memory 240 can be programs capable of being executed by one or more processors 210 located in separate computing devices 200.

Figure 3:
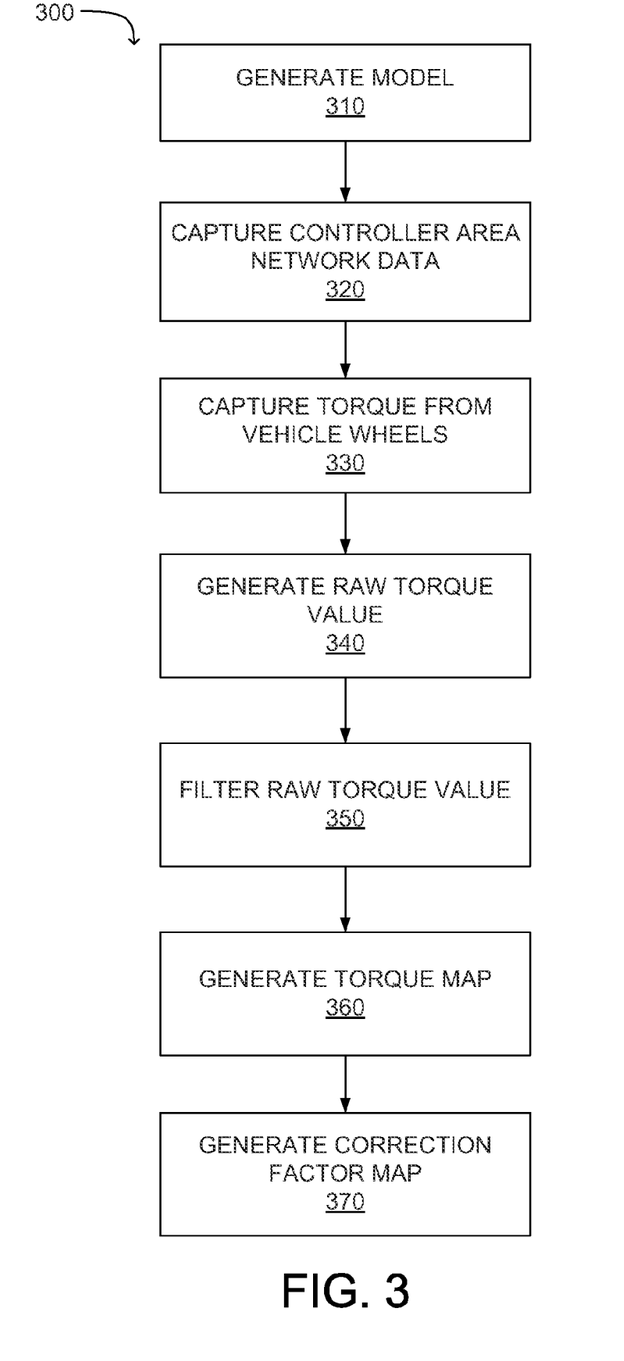
FIG. 3 is a flowchart illustrating a method for generating a torque map for a vehicular all-wheel drive system according to one embodiment of the present invention.

FIG. 3 is a flowchart illustrating one embodiment of a method 300 for generating a torque map for a vehicle all-wheel drive system. In an embodiment, the steps of the method 300 are implemented by a processor 210 of a computing device, such as the computing device described above in conjunction with FIG. 2, executing software or firmware instructions that cause the described actions, such as instructions included in the memory 240. Those of skill in the art will recognize that one or more steps of the method 300 may be implemented in embodiments of hardware and/or software or combinations thereof. For example, instructions for performing the described actions are embodied or stored within a computer readable medium, such as the memory 240. Furthermore, those of skill in the art will recognize that other embodiments can perform the steps of FIG. 3 in different orders. Moreover, other embodiments can include different and/or additional steps than the ones described here.

Initially, a model of the all-wheel drive ("AWD") electronic control unit ("ECU") 120 used by the vehicle 105 is generated 310. For example, computer readable program code describing operation of an AWD ECU 120 is retrieved from the modeling module 242 or is received by the modeling module. In one embodiment, the modeling module 242 includes vehicle-specific data, such as computer readable code, describing correction maps, gain factors, weighting tables, calibration coefficients and limit tables and other vehicle specification information for one or more vehicles which are used with additional data from a controller area network ("CAN") 100 within the vehicle 105 to produce data used for calculation of the engine torque of the vehicle 105. For example, computer readable program code describing operation of an AWD ECU 120 for a specific vehicle 105 is retrieved from, or received by, the modeling module 242. A processor 210 then executes the computer readable program code describing operation of the AWD ECU 120, causing emulation of the AWD ECU 120 by a computing device 200 including the processor 210 and retrieving the computer readable program code from the modeling module 242.

While emulating the AWD ECU 120, the computing device 200 captures 320, using the input module 210 or the communication module 250, data from the CAN 110 included in the vehicle 105, and also captures 330, using the input module 210 or the communication module 250, torque data from sensors coupled to the wheels 130 of the vehicle 105. For example, data captured from the CAN 110 included in the vehicle 105 may include wheel speed, engine speed (such as engine revolutions per minute), ignition timing, water temperature, gear ratio, acceleration, camshaft timing, fuel cut-off data, torque converter data, such as torque converter lock-up amount, data describing brake usage or other data describing operation of vehicle systems used during driving. In one embodiment, the vehicle 105 is driven and data is captured 320 from the CAN and captured 330 from sensors coupled to the wheels while the vehicle 105 is driven. Data captured 320 from the CAN 110 describes data obtained by various sensors within the vehicle 105 or data produced by one or more vehicle subsystems, such as data from a vehicle stability assist (VSA) system, transmission settings or other suitable data. Additionally, data captured 330 from the sensors coupled to the wheels 130 describes the torque applied to one or more wheels 130 as the vehicle 105 is driven.

Data from the CAN 110 and from the wheels 130 is decoded and routed to the modeling module 242, which modifies the data from the CAN 110 and from the wheels 130 so that the computing device 200 processes data in the same way as the AWD ECU 120 in the vehicle 105. In one embodiment, the correction maps, gain factors, weighting tables, calibration coefficients and limit tables from the modeling module 242 are applied to the data from the CAN 110 and from the wheels to produce values which are used to calculate engine torque. For example, the modeling module 242 divides gear ratio data from the CAN 110 is by a driveline torque received from the CAN 110 and subsequently divides the result by a torque factor, such as a K factor, to obtain a torque of a flywheel in the engine of the vehicle 105. This allows the modeling module 242 to manipulate the data from the CAN 110 and from the wheels 130 to generate 340 a raw torque value suitable for use by the AWD ECU 120 in the vehicle 105. For example, the modeling module 242 includes lookup tables, logical operations, mathematical operations or other steps which are applied to the data from the CAN and from the wheels 130 to generate 340 one or more raw torque values.

The one or more raw torque values are communicated to the torque map generation module 244, which filters 350 the one or more raw torque values to remove unwanted values. For example, the torque map generation module 244 filters 350 the raw torque values to remove torque values generated during fuel cutting or during breaking As another example, the filtering 350 stops torque calculation responsive to data from the CAN 110 indicating that the vehicle is in park or neutral. In an embodiment, the torque map generation module 244 applies one or more triggers and/or switches to the one or more raw torque values to associate a torque value with an engine speed and with an intake air pressure. By applying the triggers and/or switches to the one or more raw torque values, the torque map generation module 244 generates a torque map that is substantially similar to the torque map produced by the AWD ECU 120. In one embodiment, the AWD ECU 120 includes a torque map comprising a matrix of engine speed, vacuum pressure and torque, so as the modeling module 242 applies the model to data from the CAN 110 to calculate engine torque from driveline torque, the torque map generation module 244 stores the calculated engine speed and intake air pressure. In one embodiment, a plurality of torque values associated with an engine speed and an intake air pressure are received by the torque map generation module 244, which averages the torque values and associates the average torque value with a corresponding engine speed and intake air pressure. Hence, Torque values associated with a pairing of engine speed and intake air pressure are averaged to generate a torque value associated with a specific pairing of engine speed and intake air pressure.

Various torque values are associated with different pairings of engine speed and intake air pressure to generate 360 a torque map describing torque values associated with various combinations of engine speed and intake air pressure for use in distributing torque between front wheels 130 and rear wheels 130 at different combinations of engine speed and intake air pressure. The torque map is transmitted to the AWD ECU 120 included in the vehicle 105 for subsequent use when the vehicle 105 is driven. In one embodiment, the vehicle is driven 105 using the torque map and additional data is captured 320, 330 from the CAN 110 and from the sensors coupled to the wheels 130 and the data is communicated to the modeling module 242 to further reduce errors in the generated torque map.

Hence, the method 300 generates 360 a "real world" torque map that is produced by the modeling module 242 and the torque map generation module 246 using data obtained by driving the vehicle 105, substantially reducing the time needed to generate the torque map relative to conventional methods for torque map generation. Conventional methods for torque map generation use a chassis dynamometer to obtain an initial torque map and subsequently modify values of the torque map using hand turning or a simulation bench and generally take 36-64 hours to produce the torque map used by the AWD ECU 120 in the vehicle 105. Using the modeling module 242 and torque map generation module 244 to emulate operation of the AWD ECU 120 based on data from the CAN 110 and wheels 130, reduces the time to produce a usable torque map to 8-12 hours or less. In certain circumstances, use of the modeling module 242 and torque map generation module 244 may allow a usable torque map to be produced in as little as two hours.

In one embodiment, the torque map is also communicated to the elevation correction module 246, which also receives data from the CAN 110 and from the wheels 130. Using the torque map and the received CAN 110 data and wheel 130 data, the elevation correction module 246 produces one or more correction factors which reduce the effect of ambient air temperature and pressure on a torque value to produce a corrected torque value corresponding to a torque value obtained at a specified elevation. The elevation correction module 246 generates 370 one or more correction factors in real time using data received from the CAN 110 and from the wheels 130, reducing the time used to produce the correction factor map.

Figure 4:
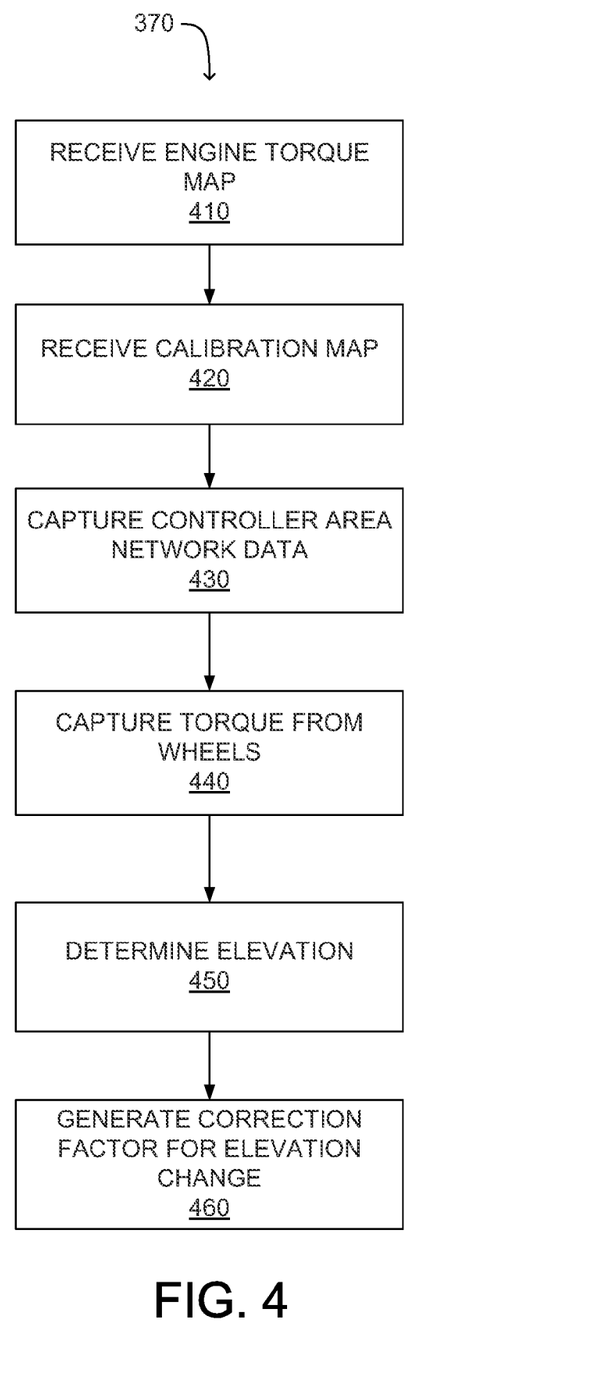
FIG. 4 is a flowchart illustrating a method for generating an elevation correction for the torque map according to one embodiment of the present invention.

FIG. 4 is a flowchart illustrating a method for generating 370 one or more elevation correction factors for a torque map. In an embodiment, the steps of the method are implemented by the processor 210 executing software or firmware instructions that cause the described actions, such as instructions included in the memory 240. Those of skill in the art will recognize that one or more steps of the method may be implemented in embodiments of hardware and/or software or combinations thereof. For example, instructions for performing the described actions are embodied or stored within a computer readable medium, such as the memory 240. Furthermore, those of skill in the art will recognize that other embodiments can perform the steps of FIG. 4 in different orders. Moreover, other embodiments can include different and/or additional steps than the ones described here.

The elevation correction module 246 receives 410, via an input module 210 or a communication module 250, the torque map from the AWD ECU 120 or from the torque map generation module 244. Receiving 410 the torque map produced by the torque map generation module 244 or from the AWD ECU 120 allows the elevation correction module 246 to use the torque map used, or to be used, by the AWD ECU 120, improving the accuracy of the correction factor. Additionally, the elevation correction module 246 receives 420, via the input module 210 or the communication module 250, one or more calibration maps 420 from the AWD ECU 120.

Using the input module 210 or the communication module 250, data is also captured 430 from the controller area network 110 included in the vehicle 105. Torque data is also captured 440 from sensors coupled to one or more wheels 130 of the vehicle 105 using the input module 210 or the communication module 250. In one embodiment, the vehicle 105 is driven and data is captured 430 from the CAN 110 and captured 440 from the sensors coupled to the wheels 130 as the vehicle 105 is driven. Data captured 430 from the CAN 110 describes data captured by various sensors within the vehicle 105 or data produced by one or more vehicle subsystems, such as data from a vehicle stability assist (VSA) system, transmission settings or other suitable data. Additionally, data captured 440 from the sensors coupled to the wheels 130 describes the torque value associated with various wheels 130 while the vehicle 105 is being driven.

The elevation of the vehicle 105 is determined 450. For example, the input module 210 or the communication module 250 receive an external signal and communicate the external signal to the elevation correction module 246. The received external signal may identify a specific elevation or may describe characteristics of the ambient air surrounding the vehicle 105 which are used by the elevation correction module 426 to determine the elevation. For example, the external signal describes the temperature, pressure, humidity and/or altitude of the air outside of the vehicle 105, such as data received from one or more vehicle sensors and transmitted through the CAN 110. Using the determined elevation, data from the CAN 110, data from the sensors coupled to the wheels 130, the torque map and the calibration map, the elevation correction module 246 generates 460 a correction factor associated with the determined elevation. Because the elevation correction module 246 and the modeling module 242 emulate performance of the AWD ECU 120 using a computing device 200 and receive data from the CAN 110 and the wheels of the vehicle 105, the one or more correction factors are generated 460 on-the-fly from data obtained from vehicle operation and are accurate without requiring additional post processing.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A computer-based method for generating a torque map operating an all-wheel drive system ("AWD") of a vehicle, the method comprising the steps of:
generating a model describing how an all-wheel drive ("AWD") electronic control unit ("ECU") included in the vehicle processes data received from one or more vehicle subsystems;
executing the model on a computing device coupled to the vehicle to emulate operation of the AWD ECU using the computing device;
capturing data from a controller area network ("CAN") included in the vehicle;
capturing data describing wheel torque from one or more wheels of the vehicle;
generating a raw torque value using the data from the CAN and the data describing wheel torque using the executed model;
filtering the raw torque value to generate a torque value associated with an engine speed and with an intake air pressure from the data captured from the CAN; and
storing the torque value and associated engine speed and intake air pressure in a computer readable storage medium included in the computing device executing the model.

2. The computer-based method of claim 1, further comprising the steps of:
generating a plurality of raw torque values using the data from the CAN and the data describing wheel torque;
filtering the plurality of raw torque values to generate a plurality of torque values, each torque value associated with an engine speed and with an intake air pressure; and
storing each of the plurality of raw torque values and the engine speed and intake air pressure associated with each torque value in a torque map included in the computer readable storage medium included in the computing device executing the model.

3. The computer-based method of claim 2, further comprising the step of:
transmitting the torque map to the all-wheel drive electronic control unit included in the vehicle for storage.

4. The computer-based method of claim 1, further comprising the steps of:
determining an elevation associated with the vehicle;
generating, using the executed model, a correction factor based on the elevation, the torque value, the data captured from the CAN and the data describing wheel torque; and
storing the correction factor in the computer readable storage medium included in the computing device executing the model.

5. The computer-based method of claim 4, wherein the step of generating the correction factor comprises:
receiving a calibration map from the all-wheel drive ("AWD") electronic control unit ("ECU") included in the vehicle; and
generating, using the executed model, the correction factor based on the elevation, the torque value, the data captured from the CAN, the data describing wheel torque and the calibration map.

6. The computer-based method of claim 4, wherein the step of determining the elevation of the vehicle comprises:
receiving an external signal specifying an elevation.

7. The computer-based method of claim 4, wherein the step of determining the elevation of the vehicle comprises:
receiving an external signal describing characteristics of ambient air surrounding the vehicle.

8. The computer-based method of claim 7, wherein the characteristics of ambient air surrounding the vehicle comprise at least one of the group of a temperature, a pressure, a humidity and an altitude.

9. The computer-based method of claim 4, wherein the correction factor produces a corrected torque value corresponding to a torque value obtained at specified elevation when applied to the torque value.

10. The computer based method of claim 1, wherein the data captured from the CAN includes data from a vehicle stability assist (VSA) system included in the vehicle and data from a transmission included in the vehicle.

11. A computer program product, comprising a non-transitory computer readable storage medium storing computer executable code for generating a torque map operating an all-wheel drive system ("AWD") of a vehicle, the computer executable code performing the steps of:
generating a model describing how an all-wheel drive ("AWD") electronic control unit ("ECU") included in the vehicle processes data received from one or more vehicle subsystems;
executing the model on a computing device coupled to the vehicle to emulate operation of the AWD ECU using the computing device;
capturing data from a controller area network ("CAN") included in the vehicle;
capturing data describing wheel torque from one or more wheels of the vehicle;
generating a raw torque value using the data from the CAN and the data describing wheel torque using the executed model;
filtering the raw torque value to generate a torque value associated with an engine speed and with an intake air pressure from the data captured from the CAN; and
storing the torque value and associated engine speed and intake air pressure in a computer readable storage medium included in the computing device executing the model.

12. The computer program product of claim 11, further comprising the steps of:
generating a plurality of raw torque values using the data from the CAN and the data describing wheel torque;
filtering the plurality of raw torque values to generate a plurality of torque values, each torque value associated with an engine speed and with an intake air pressure; and
storing each of the plurality of raw torque values and the engine speed and intake air pressure associated with each torque value in a torque map included in the computer readable storage medium included in the computing device executing the model.

13. The computer program product of claim 12, further comprising the step of:
transmitting the torque map to the all-wheel drive electronic control unit included in the vehicle for storage.

14. The computer program product of claim 11, further comprising the steps of:
determining an elevation associated with the vehicle;
generating, using the executed model, a correction factor based on the elevation, the torque value, the data captured from the CAN and the data describing wheel torque; and storing the correction factor in the computer readable storage medium included in the computing device executing the model.

15. The computer program product of claim 14, wherein the step of generating the correction factor comprises:
   receiving a calibration map from the all-wheel drive ("AWD") electronic control unit ("ECU") included in the vehicle; and
   generating, using the executed model, the correction factor based on the elevation, the torque value, the data captured from the CAN, the data describing wheel torque and the calibration map.

16. The computer program product of claim 14, wherein the step of determining the elevation of the vehicle comprises:
   receiving an external signal specifying an elevation.

17. The computer program product of claim 14, wherein the step of determining the elevation of the vehicle comprises:
   receiving an external signal describing characteristics of ambient air surrounding the vehicle.

18. The computer program of claim 17, wherein the characteristics of ambient air surrounding the vehicle comprise at least one of the group of a temperature, a pressure, a humidity and an altitude.

19. The computer program product of claim 14, wherein the correction factor produces a corrected torque value corresponding to a torque value obtained at specified elevation when applied to the torque value.

20. The computer program product of claim 11, wherein the data captured from the CAN includes data from a vehicle stability assist (VSA) system included in the vehicle and data from a transmission included in the vehicle.

21. A system for generating a torque map operating an all-wheel drive system ("AWD") of a vehicle, the system comprising:
   a controller area network for communicating data from sensors, actuators and one or more subsystems within the vehicle;
   a sensor coupled to a wheel of the vehicle, the sensor capturing data describing a torque associated with the wheel; and
   a computing device coupled to the controller area network and to the sensor coupled to the wheel, and receiving data from the controller area network and from the sensor coupled to the wheel, the computing device including computer readable program code stored in a memory and configured to be executed by a processor, the computer readable program code including instructions for:
      emulating operation of an all-wheel drive electronic control unit included in the vehicle by executing a model describing how the all-wheel drive electronic control unit processes data;
      generating, using the executed model, a raw torque value based on the data from the controller area network and from the sensor coupled to the wheel;
      filtering the raw torque value to generate a torque value associated with an engine speed and with an intake air pressure from the data received from the controller area network; and
      storing the torque value and associated engine speed and intake air pressure the memory.

22. The system of claim 21, wherein the computing device further includes computer readable program code including instructions for:
   generating a plurality of raw torque values using the data from the CAN and the data describing wheel torque;
   filtering the plurality of raw torque values to generate a plurality of torque values, each torque value associated with an engine speed and with an intake air pressure; and
   storing each of the plurality of raw torque values and the engine speed and intake air pressure associated with each torque value in a torque map included in the computer readable storage medium included in the computing device executing the model.

23. The system of claim 21, wherein the computing device further includes a communication module coupled to the all-wheel drive electronic control unit included in the vehicle, the communication module for transmitting the torque value and associated engine speed and intake air pressure to the all-wheel drive electronic control unit.

24. The system of claim 21, wherein the computing device further includes computer readable program code including instructions for:
   determining an elevation associated with the vehicle;
   generating, using the executed model, a correction factor based on the data from the CAN and the data describing wheel torque; and
   storing the correction factor in the memory.

25. The system of claim 24, wherein the computing device further includes a communication module coupled to the all-wheel drive electronic control unit included in the vehicle, the communication module for transmitting correction factor, the torque value and associated engine speed and intake air pressure to the all-wheel drive electronic control unit.

* * * * *